Feb. 5, 1952  E. S. GEARY  2,584,692
APPARATUS FOR STRIPPING INSULATION FROM WIRES
Filed June 3, 1947
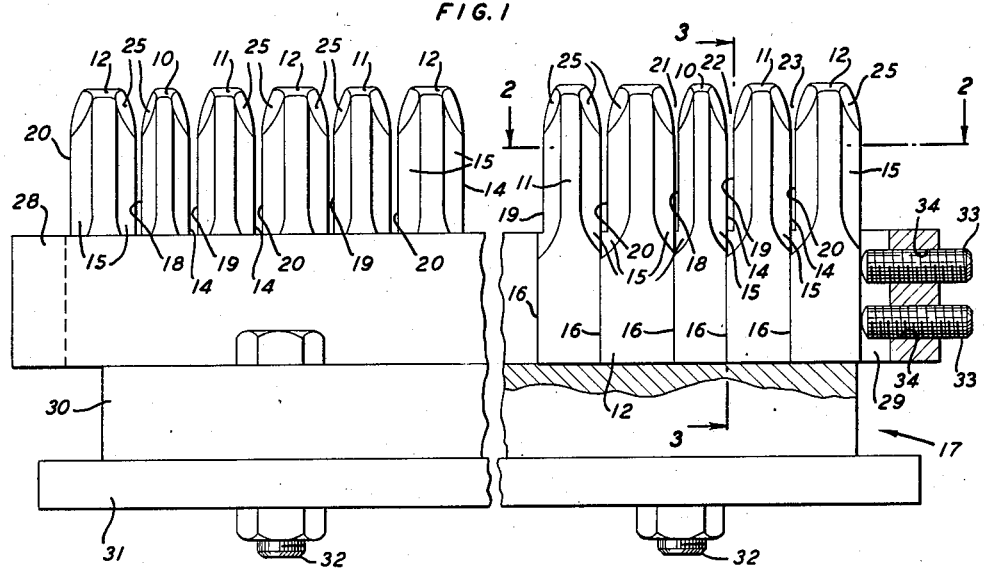
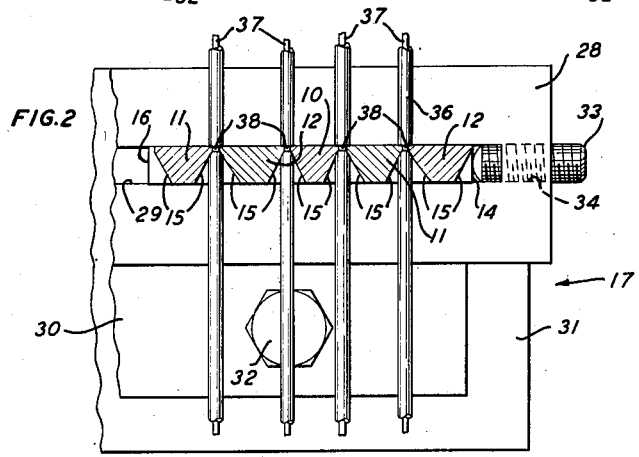
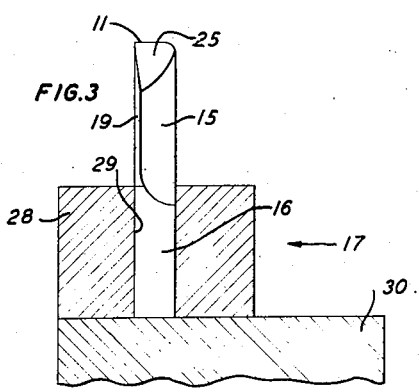
INVENTOR
E. S. GEARY
BY
ATTORNEY Patented Feb. 5, 1952

2,584,692

UNITED STATES PATENT OFFICE 2,584,692

APPARATUS FOR STRIPPING INSULATION FROM WIRES

Edward S. Geary, Nutley, N. J., assignor to Western Electric Company, Incorporated, New York, N. Y., a corporation of New York Application June 3, 1947, Serial No. 752,209

1 Claim. (Cl. 81—9.51)

This invention relates to wire strippers, and more particularly to an apparatus for stripping insulation from electrical conductors.

In the manufacture of switchboard cables, a given number of insulated electrical conductors are formed into a cable and covered with a sheath including one or more spiral wrappings or paper tape and a final textile braided covering. Given lengths are cut from the cable to prepare them for the connection of their electrical conductors between jack strips or other electrical units within the switchboard structure. The copending application of A. M. Isaacson and H. H. Merwin, Serial No. 578,544, filed February 17, 1945, now issued as Patent No. 2,465,537, dated March 29, 1929, was designed to condition switchboard cables by stripping insulation from the ends of all the conductors in the cable simultaneously. In the commercially known types of wire stripping machines, sharp edges have been employed to initially cut the insulations on the wires and to subsequently strip the insulations from given lengths of the wires. It has been found that by the use of sharp edges in stripping elements, damage frequently occurs to the conductor, severing the conductor completely in some instances, and in the others, scraping portions from the conductor to weaken it, whereby it may become broken during the process of securing it to an electrical unit. Furthermore, stripping elements with sharp edges are difficult to maintain and when a plurality of the elements is grouped together in a common unit, the maintenance becomes more difficult, if not impossible.

An object of the invention is to provide a wire stripper composed of single elements which are simple in structure, readily reconditioned and highly efficient in stripping insulation from wire.

With this and other objects in view, the invention comprises an apparatus for stripping insulation from electrical conductors, including like elements each having a first surface lying in a given plane and extending substantially the full length of the element, a second surface parallel with the first surface extending a portion of the length of the element, and an offset portion parallel with the said surfaces and positioned a given distance from the second surface which substantially equals the diameter of the wire to be stripped of its insulation and to cooperate with the first surface of another element in forming a slot to receive the wire.

More specifically, a selected number of the elements is provided which are similar in structure and vary only in their overall width and the depth of the offset portions, depending upon the diameter of the wire in each instance which is to be stripped of its insulation. A holder is provided for a given number of the elements to be mounted therein in any selected arrangement depending upon the numbers of wires of the various gages of which the switchboard cable is composed.

Each element has beveled portions adjacent their offset portions and also adjacent their first surfaces to provide surfaces of given widths upon each side of the slots to crush the insulation on a plurality of wires when forced into the slots freeing the insulation from the wires whereby the insulation may be readily stripped from the wires without damage to the wires during relative movement of the elements and the wires.

Other objects and advantages will be apparent from the following detailed description when considered in conjunction with the accompanying drawing, wherein Fig. 1 is a fragmentary front elevational view of the wire stripper, portions thereof being shown in section;

Fig. 2 is a fragmentary sectional view taken along the line 2—2 of Fig. 1; and

Fig. 3 is a vertical sectional view taken along the line 3—3 of Fig. 1.

Referring now to the drawing, the wire stripper is composed of a plurality of elements 10, 11 and 12, there being three main sizes of stripping elements in the present embodiment of the invention. These elements are similar in general structure and will receive the same reference numerals at all portions except where they differ in structure. The elements, although varying in width, are of equal thickness and include a first surface 14 which extends substantially the full length of each element and is positioned upon the right side thereof as shown in Fig. 1. The surface 14, throughout the lower area thereof, extends over the full thickness of each element, but this surface narrows down through the upper portion of each element throughout the length of a beveled portion 15 as shown in Fig. 2. A second surface 16 is parallel with the first surface 14 of each element, but extends only about half the length of each element, to be engaged by the first surface of an adjacent element when assembled in a holder indicated generally at 17. An offset portion 18 of the element 10 is of a given depth substantially equal to the diameter of the wire which is to be positioned therein. An offset portion 19 of a greater depth is formed in the element 11, and an offset portion 20 of a different depth than that of the offset portions 18 and 19 is formed in the element 12. The offset portions 18, 19 and 20 provide surfaces similar to the reduced surfaces 14, Fig. 2, positioned varied known distances from their respective second surfaces 16, to cooperate with the first surfaces 14 of any of the elements to form slots 21, 22 and 23 of widths which vary depending upon the depth of the offset portions. The beveled surfaces 15 at the offset portions 18, 19 and 20, reduce the surfaces forming parts of the slots to widths equaling the reduced first surfaces 14. The upper ends of the elements are rounded at 25 to provide wider entrances leading into the slots to facilitate in the feeding of the insulated wires into their respective slots.

The holder 17 includes a member 28 with a longitudinal groove 29 to receive the elements in any desired arrangement, the member 28 being mounted upon a base 30 which serves also as a support for the elements disposed in the groove. The base 30 is mounted upon a suitable support 31 by the aid of bolts 32. Set screws 33 disposed in threaded apertures 34 in one end of the member 28 are movable to engage the first element and to force the elements into intimate engagement with each other in their aligned formation to thus secure all the elements in place.

In the present embodiment of the invention, a group of stripping elements substantially identical in structure in every detail with the exception of their overall width and the depth of their offset portions 18, 19 and 20 render it possible for the operator to select the necessary number of each type of element and arrange these elements in their proper order depending upon the varied numbers of wires of different gages in the cable or within the group to be stripped of portions of their insulation. The selected group of elements are mounted in their proper order within the holder 17, that is, within the groove 29 of the member 28. The elements are locked in place by the set screws 33 after which the apparatus is in readiness for use. A selected number of insulated wires of the proper gages may be inserted in the grooves 21, 22 and 23, the insulation 36 on each conductor 37 being crushed as at 38 as the insulated wires are forced into their respective slots. The crushing of the insulation effectively separates the insulation on the main body of each wire from that on the portion of the wire to be stripped. This is brought about by the flat surfaces of the offset portions 18, 19 and 20 cooperating with the similar reduced first surfaces 14. The remaining portion of the stripping operation may take place by relative movement of the stripping elements and the conductors. In the aforementioned copending application of A. M. Isaacson and H. H. Merwin the conductors are moved simultaneously relative to the stationary stripping elements.

It will be apparent that although a series of stripping elements have been shown mounted in the holder 17, a unit may be formed to provide one stripping slot by the aid of any two elements positioned side by side, the first surface 14 of one of the elements serving in cooperation with the offset portion of the other element. Furthermore, it is possible to form slots of varied widths by the use of two elements, they first being positioned to employ the offset portion of one element to produce a slot of a given width and subsequently employ the offset portion of the other element to produce a slot of a different width.

Although specific improvements of the invention have been shown and described, it will be understood that they are but illustrative and that various modifications may be made therein without departing from the scope and spirit of this invention as defined by the appended claim.

What is claimed is:

An apparatus for stripping insulations from wires comprising individual elements similar in structure, each having a first surface lying in a given plane and extending substantially the full length of the element, a second surface parallel with the first surface and extending a portion of the length of the element, and a portion having a third surface positioned a given distance inwardly from the second surface which distance substantially equals the diameter of a wire to be stripped of its insulation, and a holder for holding the elements in any selected arrangement whereby the first surfaces of the elements will engage the second surfaces of adjacent elements and cooperate with the third surfaces thereof to form slots to receive insulated wires of predetermined diameters and separate the insulations from the wires forced into the slots to strip the insulations from other portions of the wires by relative movement of the wires and elements.

EDWARD S. GEARY.

REFERENCES CITED

The following references are of record in the file of this patent:

UNITED STATES PATENTS

| Number | Name | Date |
| --- | --- | --- |
| 717,800 | Bell | Jan. 6, 1903 |
| 1,337,236 | Lichtenstein | Apr. 20, 1920 |
| 1,509,044 | Kuchmuk | Sept. 16, 1924 |
| 2,415,669 | Beuschel | Feb. 11, 1947 |